Figure 5:
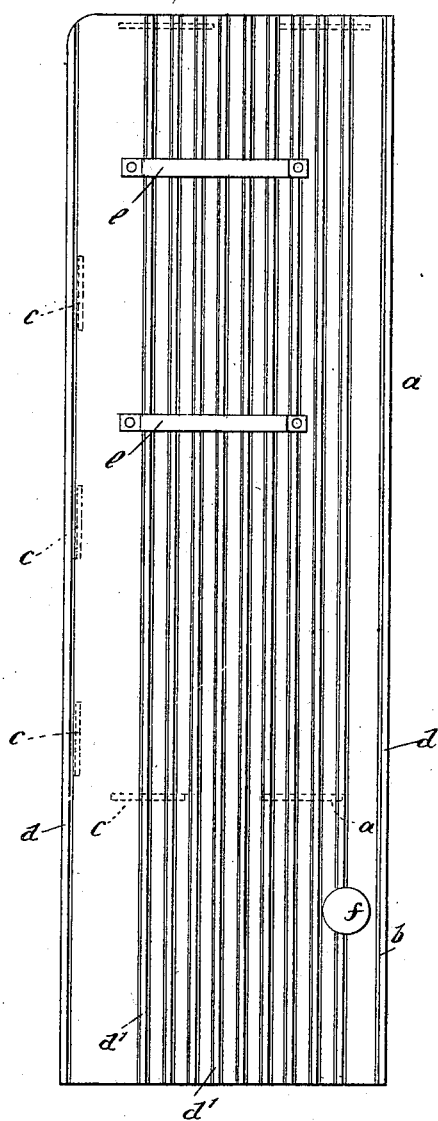

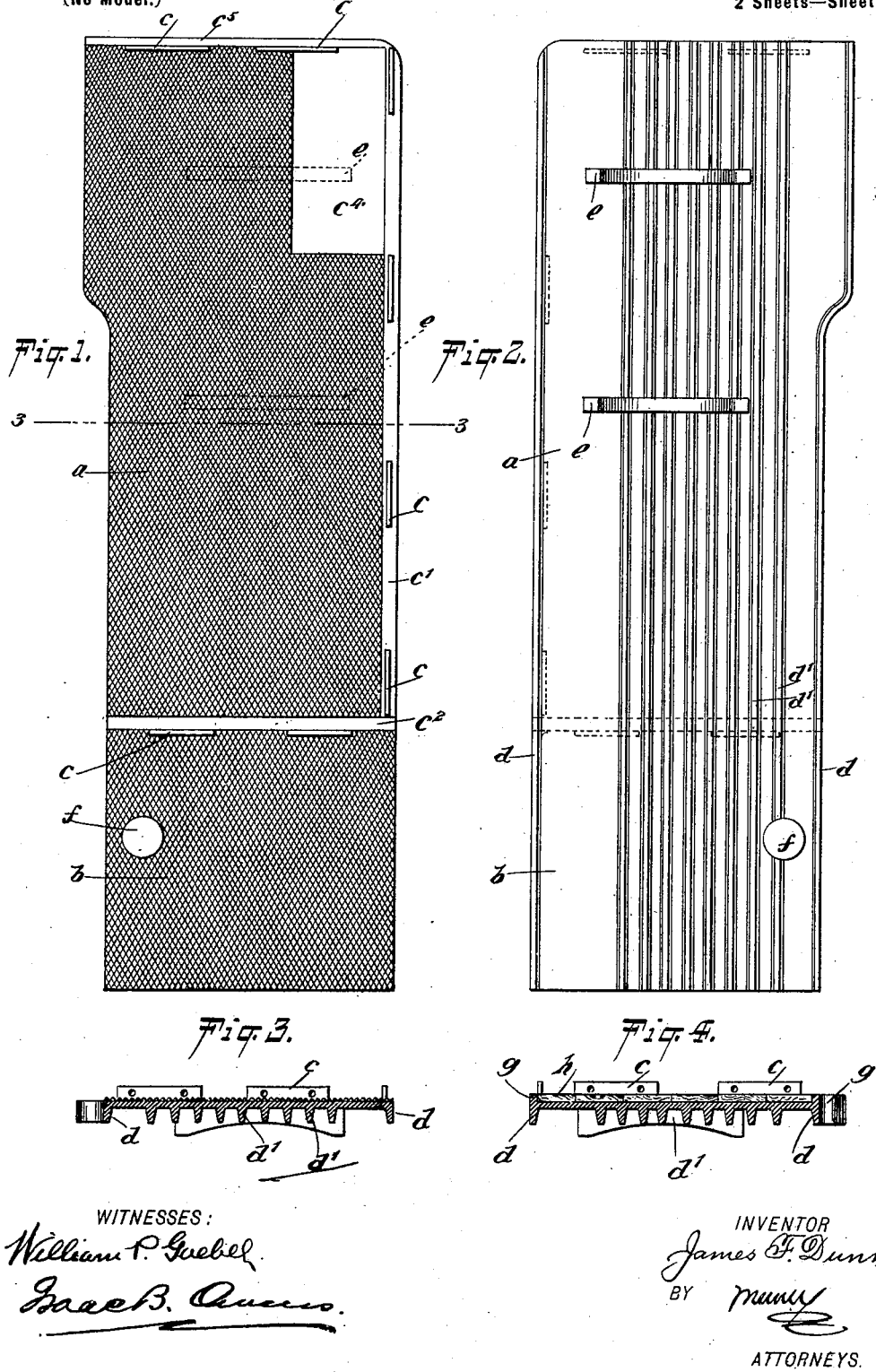

No. 631,739. Patented Aug. 22, 1899.
J. F. DUNN.
LOCOMOTIVE CAB PLATFORM.
(Application filed Apr. 4, 1899.)
(No Model.) 2 Sheets—Sheet 2.

WITNESSES:
William P. Goebel.
Isaac B. Owens.

INVENTOR
James F. Dunn
BY
Munn
ATTORNEYS.

UNITED STATES PATENT OFFICE.

JAMES F. DUNN, OF SALT LAKE CITY, UTAH.

LOCOMOTIVE-CAB PLATFORM.

SPECIFICATION forming part of Letters Patent No. 631,739, dated August 22, 1899.

Application filed April 4, 1899. Serial No. 711,650. (No model.)

*To all whom it may concern:*

Be it known that I, JAMES F. DUNN, of Salt Lake City, in the county of Salt Lake and State of Utah, have invented a new and Improved Locomotive-Cab Platform, of which the following is a full, clear, and exact description.

The object of this invention is to provide a cab-platform which will serve effectively to protect the engineer and fireman from injury sometimes inflicted by the breaking of the side rods of the locomotive, which when broken tend to fly upward into the cab. This object I accomplish by constructing the cab-platform of metal, either rolled or cast, and having certain peculiarities of structure and arrangement which enable it to resist the possible blow of the fractured side rods, thus saving from injury the persons within the cab of the locomotive.

This specification is the disclosure of two forms of my invention, while the claims define the actual scope thereof.

Reference is to be had to the accompanying drawings, forming a part of this specification, in which similar characters of reference indicate corresponding parts in all the views.

Figure 1 is a top plan view of the platform when cast of metal. Fig. 2 is a bottom plan view of the same. Fig. 3 is a section on the line 3 3 of Fig. 1. Fig. 4 is a section on the same line, but showing a wood covering or floor for the platform; and Fig. 5 is a bottom plan of a platform of rolled metal.

Cab-platforms of locomotives, as will be understood by those skilled in the art, are mounted one at each side of the boiler-head within the cab to form the floor of the cab. The platforms are also extended forwardly beyond the cab to the locomotive-pump, thus forming sections of the running-boards, which meet with the running-boards proper, the rear extremities of which are located just forward of the locomotive-pump. In the drawings the main part $a$ of the platform is arranged to form the floor proper of the cab and the extension $b$ is adapted to project out of the cab and forwardly to the rear side of the locomotive-pump, thus forming an extension of the running-board proper.

In Figs. 1 to 4, such views representing the platforms of cast metal, the platform is cast with integral lugs $c$, projected upwardly and adapted to have the cab sides fastened thereto. The top of the platform is milled over its entire upper surface, excepting at its outer edge $c'$ where the upper surface is left clear for the engagement of the sides of the cab at the front of the main part $a$, where a transverse plane portion $c^3$ is left for the engagement of the front walls of the cab, and at the rear outer corner $c^4$, where a plane surface is left for the box forming the engineer's seat. A plane surface $c^5$ may also be left along the rear edge of the platform to be engaged by the rear wall of the cab. The inner edge of the platform—namely, the left-hand edge in Fig. 1 and the right-hand edge in Fig. 2—is shaped so as to permit it to extend beyond the line of the boiler-head. The under face of the platform is cast with longitudinally-extending side edge flanges $d$ and with a number of longitudinal flanges $d'$, located in the middle of the platform. All of the flanges $d$ and $d'$ serve to strengthen the platform and to resist the possible blow of the fractured side rod. I also cast on the bottom of the platform two brackets $e$, to which the air-reservoir may be bolted, and the front extension $b$ of the platform may be provided with one or more openings to permit the passage of certain of the locomotive-fixtures. For example, the said extension may have an orifice $f$ formed therein near its inner edge. In Fig. 4 I have shown the upper face of the platform cast with low side edge flanges $g$, which carry between them a wooden floor or tread $h$, rested on the top face of the platform and serving to take the place of the milled upper face. (Shown in Figs. 1 and 3.)

The form of the invention in which the platform is constructed of rolled or malleable metal, as shown in Fig. 5, is adapted to have the brackets $e$ and lugs $c$ riveted, bolted, or otherwise removably secured in place. The platform is rolled integrally with the side edge flanges $d$ on its bottom and the middle flanges $d'$ all running longitudinally and parallel, as shown. In this view the inner edge of the platform is shown straight to facilitate rolling the same.

Having thus described my invention, I claim as new and desire to secure by Letters Patent—

1. A locomotive-cab platform, constructed of an integral mass of metal and formed on its bottom face with downwardly-projecting ribs respectively at its side edges, and with metal centrally-located ribs running parallel with each other and longitudinally with the platform.

2. A locomotive-cab platform, constructed of metal, and having a milled upper surface with plane portions left thereon to be engaged by the lower edges of the walls of the cab, and the platform having upwardly-projected lugs juxtaposed to said plane portions, by which to fasten the said platform to the cab-walls.

3. A locomotive-cab platform, having downwardly-projected ribs formed on its under face and running longitudinally with the platform, and having upwardly-projected lugs formed on its upper face, the lugs serving to permit the fastening of the platform to the walls of the cab.

JAMES F. DUNN.

Witnesses:
    JNO. M. RITTER,
    ISAAC B. OWENS.